United States Patent
Meeker et al.

(10) Patent No.: US 6,574,865 B2
(45) Date of Patent: Jun. 10, 2003

(54) SELF-RETAINED WHEEL BEARING ASSEMBLY

(75) Inventors: Steven Eugene Meeker, Norwalk, OH (US); Richard Allen Scheufler, Jr., Collins, OH (US); George Leonard Hurrell, II, Port Clinton, OH (US); Scott A. Maddox, Sandusky, OH (US); Christopher J. Zuck, Sandusky, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/117,643

(22) Filed: Apr. 5, 2002

(65) Prior Publication Data

US 2002/0110300 A1 Aug. 15, 2002

Related U.S. Application Data

(62) Division of application No. 09/695,350, filed on Oct. 24, 2000.

(51) Int. Cl.$^7$ .............................. B21K 1/40; B60B 27/00
(52) U.S. Cl. .............................. 29/894.361; 29/898.062; 29/898.07; 29/724; 72/370.1; 301/105.1; 384/537; 384/544
(58) Field of Search ................ 29/894.36, 894.361, 29/894.362, 898.07, 898.09, 898.06, 898.061, 898.06 L, 507, 522.1, 523, 724; 301/105.1; 384/543, 544, 537; 72/370.03, 370.06, 370.1

(56) References Cited

U.S. PATENT DOCUMENTS

| | | | | |
|---|---|---|---|---|
| 4,887,917 | A | * | 12/1989 | Troster et al. |
| 5,536,075 | A | * | 7/1996 | Bertetti |
| 5,822,859 | A | * | 10/1998 | Kessen et al. |
| 2001/0019223 | A1 | * | 9/2001 | Kaneko |
| 2002/0012486 | A1 | * | 1/2002 | Ishida et al. |
| 2002/0062564 | A1 | * | 5/2002 | Hagiwara et al. |

* cited by examiner

Primary Examiner—Gregory M. Vidovich
Assistant Examiner—Eric Compton
(74) Attorney, Agent, or Firm—Scott A. McBain

(57) ABSTRACT

A wheel bearing assembly for supporting a wheel is provided. The assembly includes a spindle defining a rotational axis and a support member for supporting the spindle. A wheel hub has a flange for securing the wheel thereto. The wheel hub is supported on the spindle and is rotatable about the rotational axis. A bearing assembly has first and second bearing members in spaced relationship from one another with a plurality of bearings interposed between the bearing members to permit relative rotation between the bearing members about the rotational axis. The first bearing member is arranged adjacent to the spindle and the second bearing member is arranged adjacent to either the wheel hub or the support member. An inner surface of the first bearing member has an annular counterbore. The spindle is deformed into the counterbore to axially secure the first bearing member to the spindle and prevent relative rotation between the spindle and the first bearing member about the rotational axis. This minimizes both axial bearing length and spindle member distortion.

10 Claims, 2 Drawing Sheets

SELF-RETAINED WHEEL BEARING ASSEMBLY

This is a division of application Ser. No. 09/695,350 filed on Oct. 24, 2000.

TECHNICAL FIELD

This invention relates to a wheel bearing assembly for supporting a wheel, and more specifically, the invention relates to an apparatus and method for securing a wheel bearing assembly to a wheel assembly member.

BACKGROUND OF THE INVENTION

Wheel bearing assemblies are used between spindles and either a support member or a wheel hub, depending on the particular configuration, for permitting relative rotation between the spindle and the support member or wheel hub. For wheel bearing assemblies that do not have raceways integrally formed with the wheel assembly members, the raceway adjacent to the spindle must somehow be secured to the spindle to prevent the bearing from separating axially. This has been accomplished in several manners which have presented unique problems. One such manner was by machining grooves in the spindle using C-keepers or lock rings to capture the raceway. However, these rings and grooves must be precisely machined and ground so that they mate properly with one another. Yet another manner in which the spindle was secured to the bearing member was to plastically deform the end of the spindle along its axis to axially retain the bearing member on the spindle. One difficulty with this method was that in plastically deforming the spindle the end of the spindle was typically rolled over the end of the bearing member which added length to the spindle assembly. Another problem with this method was that in plastically deforming the spindle the outer diameter of the bearing member was increased thereby affecting the fit between a seal that was placed between the bearing members. As a result, the performance of the wheel bearings and the fit of the bearing seal between the bearing members would vary from assembly to assembly. This method was also prone to residual stresses under load.

Therefore, an apparatus and method for securing a wheel bearing assembly to a wheel assembly in which the overall length of the spindle is reduced is desired. It is also desired to have a method of securing the wheel bearing assembly and spindle together. This will better control expansion of the bearing member during the deformation process of the spindle. It will result in the bearing seal having a consistent fit between wheel assemblies and reduction of residual stresses.

SUMMARY OF THE INVENTION

The present invention provides a wheel bearing assembly for supporting a wheel assembly member. The assembly includes a spindle defining a rotational axis and a support member for supporting the spindle. A wheel hub has a flange for securing the wheel thereto. The wheel hub is supported on the spindle and is rotatable about the rotational axis. A bearing assembly has first and second bearing members in spaced relationship from one another with a plurality of bearings interposed between the bearing members to permit relative rotation between the bearing members about the rotational axis. The first bearing member is arranged adjacent to the spindle and the second bearing member is arranged adjacent to either the wheel hub or the support member. An inner surface of the first bearing member has an annular counterbore. The spindle is radially deformed into the counterbore to secure the first bearing member to the spindle and prevent relative rotation between the spindle and the first bearing member about the rotational axis.

Another aspect of the present invention provides a method of securing a wheel assembly member to a bearing member. First, a bearing member is provided having a shape with an inner surface that includes an annular counterbore. The wheel assembly member has an interior cavity defined by an interior surface. Second, the bearing member is arranged onto the wheel assembly member. Third, materials provided about the bearing member to significantly maintain the shape of the bearing member. Next, a cold forming tool is inserted into the interior cavity of the wheel assembly member. Finally, the interior surface of the wheel assembly is engaged with the cold forming tool and deforms a portion of the wheel assembly into engagement with the annular counterbore.

Accordingly, an apparatus and method for securing a wheel bearing assembly to a wheel assembly in which the overall length of the spindle is reduced is provided. Additionally, a method of securing the wheel bearing assembly and spindle together is provided so that the expansion of the bearing member during the deformation process of the spindle is controlled. Thus, the bearing seal has a consistent fit between wheel assemblies and residual stresses are reduced.

BRIEF DESCRIPTION OF THE DRAWINGS

Other advantages of the present invention can be understood by reference to the following detailed description when considered in connection with the accompanying drawings wherein.

DESCRIPTION OF THE PREFERRED EMBODIMENT

Figure 1:
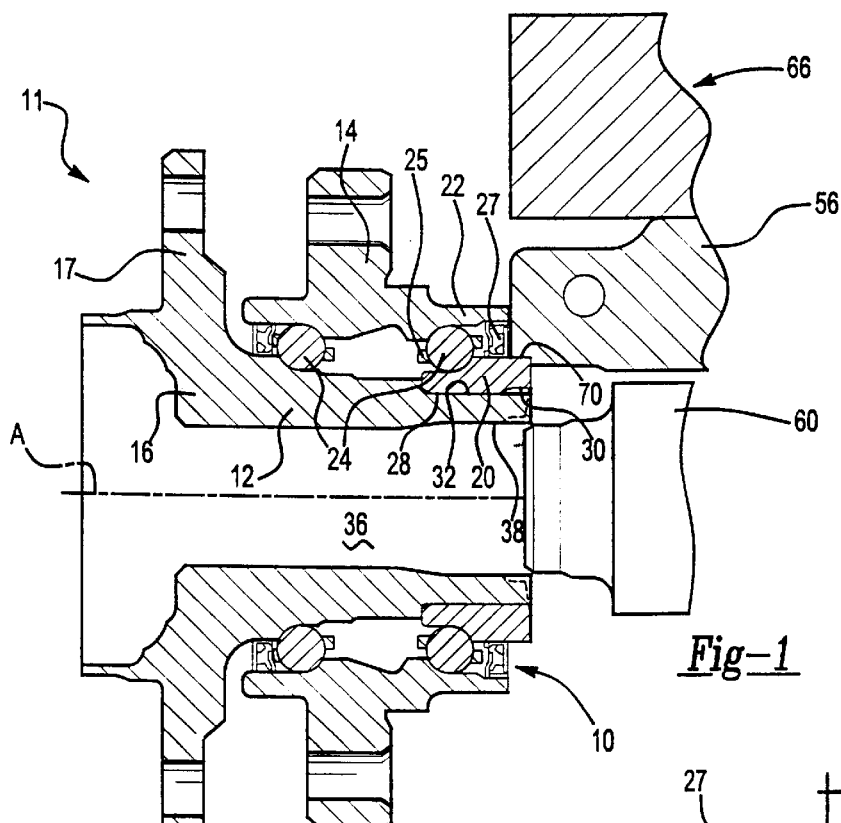
FIG. 1 is a cross-sectional view of a spindle secured to a bearing member in accordance with the present invention.

A wheel bearing assembly 10 is shown in FIG. 1 for supporting a wheel (not shown) in a wheel assembly 11. A spindle 12 defines a rotational axis A; and a support member 14 supports the spindle 12. Support member 14 may be secured to a portion of the vehicle (not shown) by fasteners or the like. A wheel hub 16 has a flange 17 for securing the wheel thereto and is supported on spindle 12 adjacent support member 14. In the embodiment shown in FIG. 1, wheel hub 16 is integrally formed with spindle 12. Wheel hub 16 and spindle 12 are rotatable about rotational axis A. A drive mechanism is coupled to spindle 12 for rotationally driving the wheel (not shown). Bearing assembly 10 is arranged to permit the members of wheel assembly 11 to rotate relative to one another.

Bearing assembly 10 has first 20 and second 22 bearing members in spaced relation with one another and a plurality of bearings 24, such as ball bearings, retained by a cage 25. Bearings 24 are interposed between first 20 and second 22 bearing members to permit relative rotation between the bearing members 20, 22 about the rotational axis A. First bearing member 20 is adjacent spindle 12 and second bearing member 22 is adjacent either the wheel hub or the support member, depending on the particular configuration of the wheel assembly 11. In the embodiment shown, second bearing member 22 is integrally formed with support member 14. Bearing assembly 10 further includes a bearing seal 27 interposed between spindle 12 and support member 14 adjacent to bearings 24 to prevent debris from contaminating bearings 24. The diameters of first 20 and second 22 bearing members must not change significantly during the assembly process so that bearing seal 27 will fit properly.

An inner surface 28 of first bearing member 20, which is an inner race, has an annular counterbore 30. Spindle 12 has an outer surface 32 that supports the inner surface 28 of first bearing member 20. Spindle 12 further includes an interior cavity 36 with an interior surface 38 proximate to annular counterbore 30. Spindle 12 is deformed into annular counterbore 30 by engaging interior surface 38 with a punch or similar tool to secure first bearing member 20 to spindle 12 and prevent relative rotation between spindle 12 and first bearing member 20 about rotational axis A.

Figure 2:
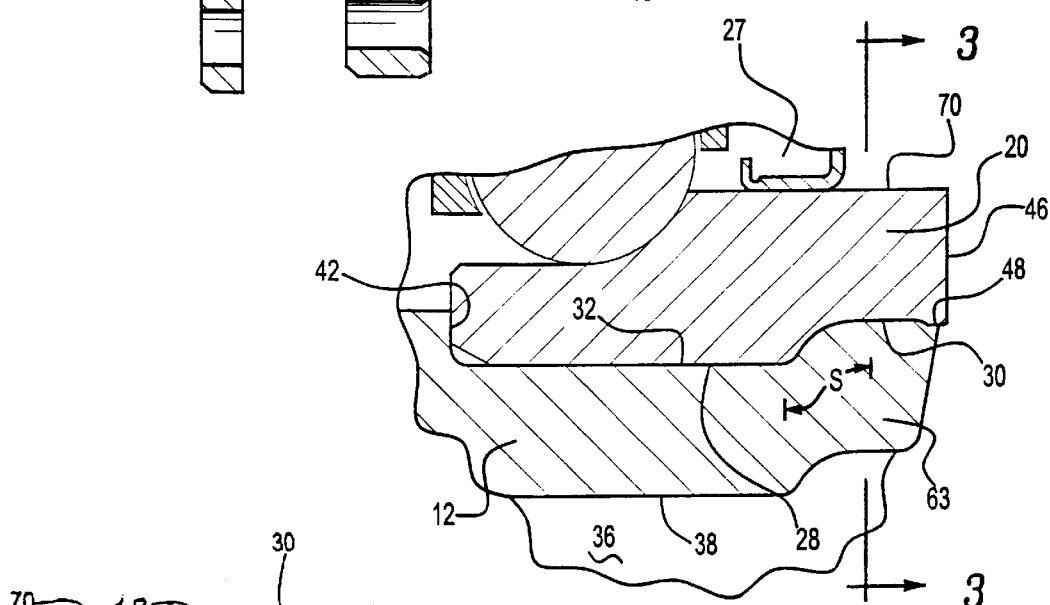
FIG. 2 is an enlarged cross-sectional view of the spindle and bearing member with the spindle fully deformed into engagement with the bearing member.
Figure 3:
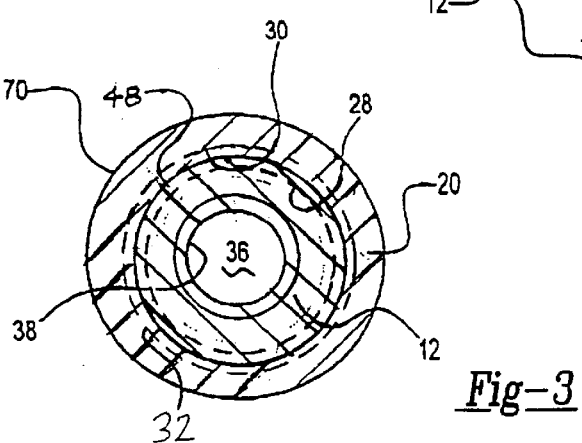
FIG. 3 is a cross-sectional view taken along line 3—3 in FIG. 2.

FIG. 2 depicts wheel assembly 11 with spindle 12 deformed into annular counterbore 30. Annular counterbore 30 preferably has an S-shaped cross-section defined by a plane through the rotational axis A intersecting counterbore 30. Spindle 12 has a shoulder 42 adjacent to outer surface 32 of spindle 12 so that first bearing member 20 abuts shoulder 42 upon installation of bearing assembly 10. Preferably, first bearing member 20 has an end 46 with a step 48 protruding inward from counterbore 30 extending from the S-shaped cross-section. Step 48 further ensures that first bearing member 20 is securely retained on spindle 12. FIG. 3 shows spindle 12 fully deformed into the counterbore 30. Of course, a mating S-shape on spindle 12 may also be utilized to further enhance axial look-up and resist independent radial rotation of spindle members. It will be appreciated that one skilled in the art may use other known shapes than disclosed herein.

Figure 4:
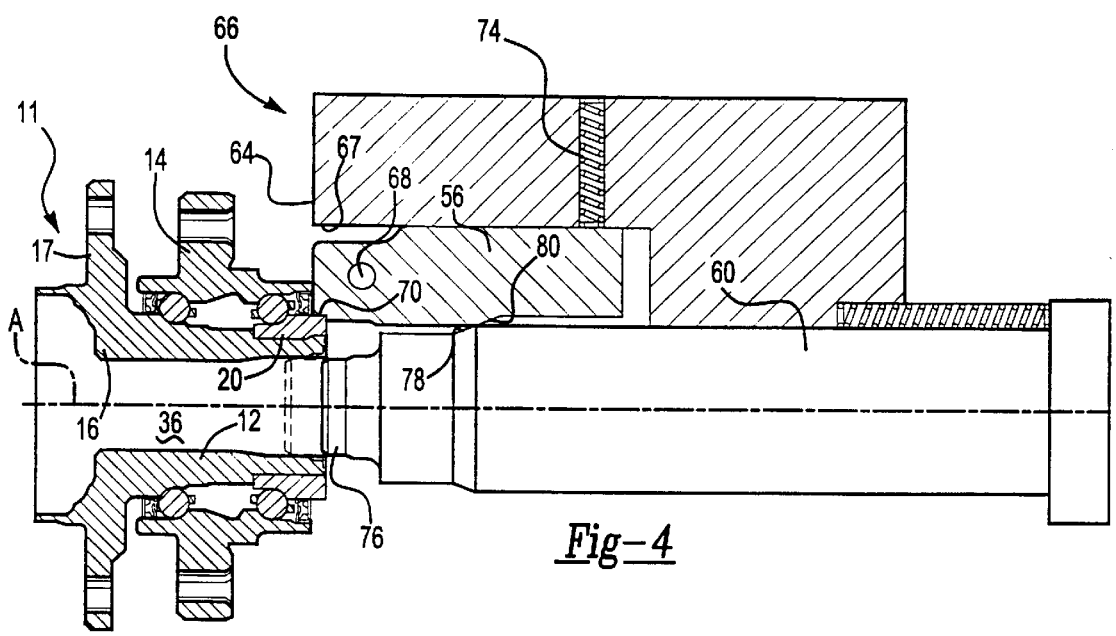
FIG. 4 is a cross-sectional view of the wheel assembly shown in FIG. 1 during the forming process in which the spindle becomes deformed.

A preferred method of securing a wheel assembly member, such as spindle 12, to first bearing member 20 is depicted in FIG. 4. A bearing member 20 is provided having a shape with an inner surface 28 that includes counterbore 30. A wheel assembly member, such as spindle 12, is provided with interior cavity 36 defined by interior surface 38. Bearing member 20 is arranged onto spindle 12. Material is provided about bearing member 20, such as the collet 56 that is discussed below, to significantly maintain the shape of the bearing member 20 when spindle 12 is deformed. A cold forming tool 60 is inserted into interior cavity 36 of spindle 12. Cold forming tool 60 engages interior surface 38 of spindle 12 and deforms a portion or end 63 of spindle 12 into engagement with annular counterbore 30 thereby locking first bearing member 20 and spindle 12 together.

In operation, after first bearing member 20 is arranged onto the spindle 12, wheel assembly 11 is positioned at working end 64 of cold forming machine 66. Cold forming machine 66 has an opening 67 with preferably three collet jaws 56 (only one shown) disposed radially about opening 67. Collet jaws 56 are supported within opening 67 by pivot pins 68 so that they may open and close to release and engage an outer surface 70 of first bearing member 20. Springs 74 are arranged transverse to collet jaws 56 in spaced relation from pivot pins 68 to bias collet jaws 56 open.

Cold forming tool 60, which has a forming end 76, is disposed between collet jaws 56. Cold forming tool 60 is actuatable along axis A. A spring 77 biases cold forming tool 60 to a retracted position. Cold forming tool 60 and collet jaws 56 have sloped surfaces 78, 80 that coact with one another to open and close collet jaws 56 when cold forming tool 60 is actuated. Specifically, when cold forming tool 60 is in a retracted position, collet jaws 56 are open for receiving wheel assembly 11. As cold forming tool 60 is advanced from the retracted position, sloped surface 78 engages sloped surface 80 forcing collet jaws 56 closed and into engagement with outer surface 70, as shown in FIG. 4. Cold forming tool 60 continues to advance until forming end 76 enters interior cavity 36 and end 63 of spindle 12 is deformed into counterbore 30. Preferably, end 63 has a chamfer leading into interior cavity 36 to guide cold forming tool 60.

Collet jaws 56 ensure that the diameter of outer surface 70 of first bearing member 20 is maintained. This ensures a proper fit of bearing seal 27 between first 20 and second 22 bearing members. Thus, bearing seal 27 functions properly in service and inner race residual stresses are reduced.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

Having thus described the invention, it is claimed:

1. A method of securing a wheel assembly member to a bearing member comprising the steps of:
   a) providing the bearing member having a shape with an inner surface including a counterbore, and the wheel assembly member with an interior cavity defined by an interior surface;
   b) arranging the bearing member onto the wheel assembly member;
   c) providing material about the bearing member to significantly maintain the shape of the bearing member;
   d) inserting a cold forming tool into the interior cavity of the wheel assembly member; and
   e) engaging the interior surface of the wheel assembly member with the cold forming tool and deforming a portion of the wheel assembly member into engagement with the counterbore.

2. The method as set forth in claim 1 wherein the wheel assembly member comprises a spindle with the portion comprising an end of the spindle.

3. The method as set forth in claim 2 wherein the end of the spindle has a chamfer leading into the interior cavity to guide the cold forming tool.

4. The method as set forth in claim 1 wherein the cold forming tool comprises a punch.

5. The method as set forth in claim 1 wherein step c) comprises placing a collet in engagement with an outer surface of the bearing member.

6. The method as set forth in claim 5 wherein the outer surface has a diameter that is significantly the same after steps b) and e).

7. The method as set forth in claim 6 wherein step a) includes further providing a support member for supporting the wheel assembly member, and the method further includes the step of: f) installing a bearing seal between the wheel assembly member and the support member.

8. The method as set forth in claim 1 wherein the counterbore has an S-shaped contour.

9. The method as set forth in claim 1 wherein the wheel assembly member has an outer surface and the bearing member comprises an inner race supported on said outer surface of said wheel assembly member.

10. The method as set forth in claim 1 wherein the wheel assembly member comprises a wheel hub with the bearing member integrally formed with the wheel hub, and the material of step c) comprising a flange extending radially outwardly from the wheel hub.

* * * * *